US009910533B2

United States Patent
Agarwal et al.

(10) Patent No.: US 9,910,533 B2
(45) Date of Patent: Mar. 6, 2018

(54) TIMING SCHEME FOR TOUCH SCREEN SUPPORTING VARIABLE REFRESH RATE

(71) Applicant: Apple Inc., Cupertino, CA (US)

(72) Inventors: Manu Agarwal, Redwood City, CA (US); Hopil Bae, Sunnyvale, CA (US); Kingsuk Brahma, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 118 days.

(21) Appl. No.: 14/866,797

(22) Filed: Sep. 25, 2015

(65) Prior Publication Data

US 2016/0370915 A1    Dec. 22, 2016

Related U.S. Application Data

(60) Provisional application No. 62/182,398, filed on Jun. 19, 2015.

(51) Int. Cl.
   *G06F 3/041* (2006.01)
   *G09G 3/00* (2006.01)
   *G06F 3/044* (2006.01)

(52) U.S. Cl.
   CPC .......... *G06F 3/0416* (2013.01); *G09G 3/00* (2013.01); *G06F 3/044* (2013.01)

(58) Field of Classification Search
   CPC ......... G06F 3/0416; G06F 3/044; G09G 5/18; G09G 3/00
   See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Richard Hong
(74) *Attorney, Agent, or Firm* — Morrison & Foerster LLP

(57) ABSTRACT

Various timing schemes can be used to synchronizing display functions with touch and/or stylus sensing functions for devices including a variable refresh rate (VRR) display. In a continuous-touch mode, for example, extended blanking can result in frame judder due to mismatch or latency between reporting of sensing data and the display. To minimize these issues, sensing operations can reset to re-synchronize with the display operation, and unreported data from sensing scans can be discarded or ignored. In some examples, a display frame can be divided into two sub-frames, and a system can be configured to perform a touch sensing scan during the first sub-frame of a display frame. At the conclusion of extended blanking, the sensing operations can reset to re-synchronize with the display. The touch sensing scan can be completed in one intra-frame pause and can begin at the start of the display frame.

15 Claims, 8 Drawing Sheets

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 8,780,065 B2 | 7/2014 | Ribeiro et al. |
| 8,947,373 B2 | 2/2015 | Kremin et al. |
| 2006/0197753 A1 | 9/2006 | Hotelling |
| 2006/0221011 A1 | 10/2006 | Aoki |
| 2012/0256861 A1 | 10/2012 | Park |
| 2013/0057503 A1* | 3/2013 | Hristov ............... G06F 3/044 345/174 |
| 2013/0176251 A1* | 7/2013 | Wyatt ................. G09G 5/18 345/173 |
| 2013/0194229 A1 | 8/2013 | Sabo et al. |
| 2013/0257752 A1 | 10/2013 | Tripathi et al. |
| 2014/0002465 A1 | 1/2014 | Kwa et al. |
| 2014/0071066 A1* | 3/2014 | Lee ..................... G06F 3/0416 345/173 |
| 2014/0132560 A1 | 5/2014 | Huang et al. |
| 2014/0267067 A1 | 9/2014 | Fuller et al. |
| 2016/0092010 A1 | 3/2016 | Agarwal |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated Jul. 8, 2016, for U.S. Appl. No. 14/500,653, filed Sep. 29, 2014, 15 pages.

Non-Final Office Action dated Dec. 18, 2015, for U.S. Appl. No. 14/500,653, filed Sep. 29, 2014, 13 pages.

Non-Final Office Action dated Feb. 27, 2017, for U.S. Appl. No. 14/500,653, filed Sep. 29, 2014, 17 pages.

* cited by examiner

TIMING SCHEME FOR TOUCH SCREEN SUPPORTING VARIABLE REFRESH RATE

CROSS-REFERENCE TO RELATED APPLICATIONS

This application is a non-provisional application of U.S. Provisional Patent Application No. 62/182,398, filed Jun. 19, 2015, which is hereby incorporated by reference it its entirety.

FIELD OF THE DISCLOSURE

This relates generally to touch sensitive devices and, more specifically, to touch-sensitive display devices that can have a variable refresh rate.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event. Additionally, touch sensitive devices can also accept input from one or more active styli.

As touch sensing technology continues to improve, variable display rate displays can be used to save power when displaying static images or slowly changing images, or to improve performance in computationally intensive graphical environments (e.g., gaming environments). However, variable display rate operation can disrupt the synchronization between the display functions and various touch and/or stylus sensing functions, thereby degrading the performance of the device.

BRIEF SUMMARY OF THE DISCLOSURE

This relates to synchronizing display functions with touch and/or stylus sensing functions for devices including a variable refresh rate (VRR) display. VRR display operation can be beneficial, for example, to reduce power when displaying static or slow changing data and/or to avoid display artifacts by providing sufficient time to render high fidelity images in computationally intensive environments (e.g., video game applications) before refreshing the display. However, adjusting the refresh rate of the display can complicate the synchronization of various sensing operations and can degrade performance. In a continuous-touch mode, for example, extended blanking of the display for a period corresponding to other than an integer number of display frame periods can result in dynamic mismatch or latency between reporting of sensing data and the corresponding displayed image, which can result in frame judder. Frame judder can manifest as lack of smoothness to touch response as a result of the mismatch between display refresh timing sensing timing. Mismatch or latency between the sensing data and the corresponding image on the display can be corrected in software and/or firmware by time-stamping results and processing the sensing data and time-stamps. In other examples, the sensing operation can be reset to re-synchronize the sensing scans with the display operation. The unreported data from sensing scans that occurred during the extended blanking can be discarded or ignored to prevent mismatch or latency between the sensing data and the corresponding image on the display. In some examples, a display frame can be divided into two sub-frames, and the system can be configured to perform a touch sensing scan during the first sub-frame of a display frame. At the conclusion of extended blanking of the display, the sensing system can be reset to re-synchronize the sensing scans with the display operation. The touch sensing scan performed in the first sub-frame of a display frame can be completed in one intra-frame pause in the display refresh process and can begin at the start of the display frame. Data from the touch sensing scan can be reported at or proximate to the conclusion of the touch sensing scan.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to synchronizing display functions with touch and/or stylus sensing functions for devices including a variable refresh rate (VRR) display. VRR display operation can be beneficial, for example, to reduce power when displaying static or slow changing data and/or to avoid display artifacts by providing sufficient time to render high fidelity images in computationally intensive environments (e.g., video game applications) before refreshing the display. However, adjusting the refresh rate of the display can complicate the synchronization of various sensing operations and can degrade performance. In a continuous-touch mode, for example, extended blanking of the display for a period corresponding to other than an integer number of display frame periods can result in mismatch or latency between reporting of sensing data and the corresponding displayed image, which can result in frame judder. Mismatch or latency between the sensing data and the corresponding image on the display can be corrected in software and/or firmware by time-stamping results and processing the sensing data and time-stamps. In other examples, the sensing operation can be reset to re-synchronize the sensing scans with the display operation. The unreported data from sensing scans that occurred during the extended blanking can be discarded or ignored to prevent mismatch or latency between the sensing data and the corresponding image on the display. In some examples, a display frame can be divided into two sub-frames, and the system can be configured to perform a touch sensing scan during the first sub-frame of a display frame. At the conclusion of extended blanking of the display, the sensing system can be reset to re-synchronize the sensing scans with the display operation. The touch sensing scan performed in the first sub-frame of a display frame can be completed in one intra-frame pause in the display refresh process and can begin at the start of the display frame. Data from the touch sensing scan can be reported at or proximate to the conclusion of the touch sensing scan.

Figure 1A:
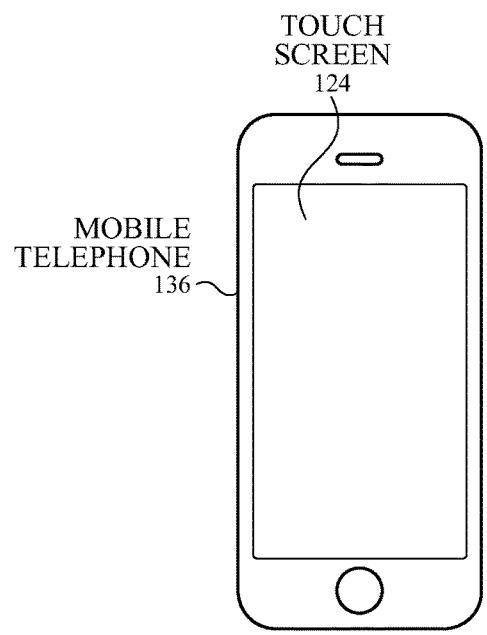
FIGS. 1A-1D illustrate examples of systems with variable refresh rate (VRR) displays that can implement a synchronization scheme to synchronize display functions and various touch and/or stylus sensing functions according to examples of the disclosure.
Figure 1B:
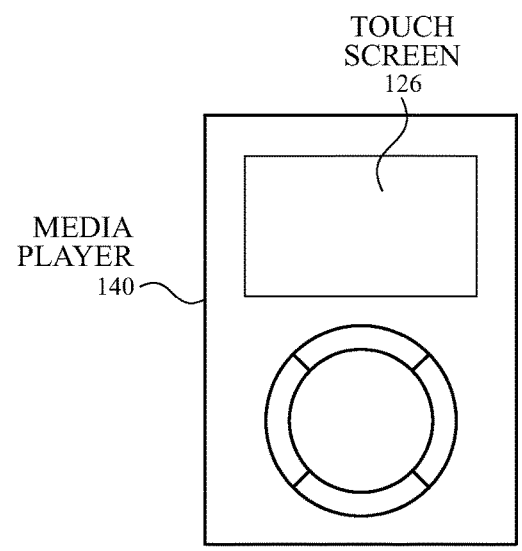
Figure 1C:
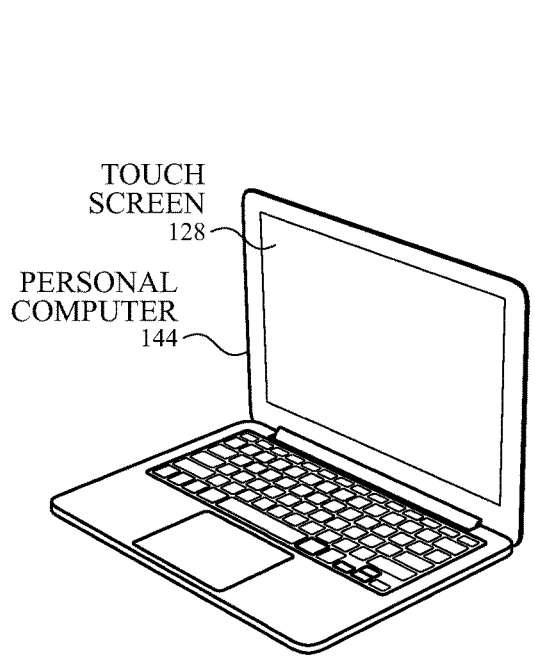
Figure 1D:
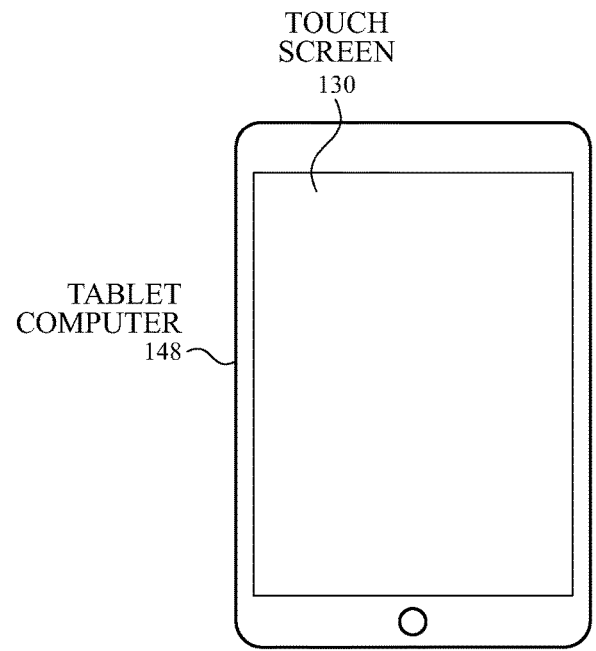

FIGS. 1A-1D illustrate examples of systems with variable refresh rate (VRR) displays that can implement a synchronization scheme to synchronize display functions and various touch and/or stylus sensing functions according to examples of the disclosure. FIG. 1A illustrates an exemplary mobile telephone 136 that includes a VRR touch screen 124 and other computing system blocks that can implement a synchronization scheme to synchronize display functions and various touch and/or stylus sensing functions according to examples of the disclosure. FIG. 1B illustrates an example digital media player 140 that includes a VRR touch screen 126 and other computing system blocks that can implement a synchronization scheme to synchronize display functions and various touch and/or stylus sensing functions according to examples of the disclosure. FIG. 1C illustrates an example personal computer 144 that includes a VRR touch screen 128 and other computing system blocks that can implement a synchronization scheme to synchronize display functions and various touch and/or stylus sensing functions according to examples of the disclosure. FIG. 1D illustrates an example tablet computing device 148 that includes a VRR touch screen 130 and other computing system blocks that can implement a synchronization scheme to synchronize display functions and various touch and/or stylus sensing functions according to examples of the disclosure. The VRR touch screen and computing system blocks that can implement a synchronization scheme to synchronize display functions and various touch and/or stylus sensing functions can be implemented in other devices including wearable devices.

Touch screens 124, 126, 128 and 130 can be based on, for example, self-capacitance or mutual capacitance sensing technology, or another touch sensing technology. For example, in a self-capacitance based touch system, an individual electrode with a self-capacitance to ground can be used to form a touch pixel (touch node) for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (i.e., orthogonal). Touch pixels (touch nodes) can be formed at the intersections or adjacencies (in single layer configurations) of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel. This reduction in the charge-coupled AC waveform can be detected and measured by the touch sensing system to determine the positions of multiple objects when they touch the touch screen. In some examples, a touch screen can be multi-touch, single touch, projection scan, full-imaging multi-touch, or any capacitive touch.

Figure 2:
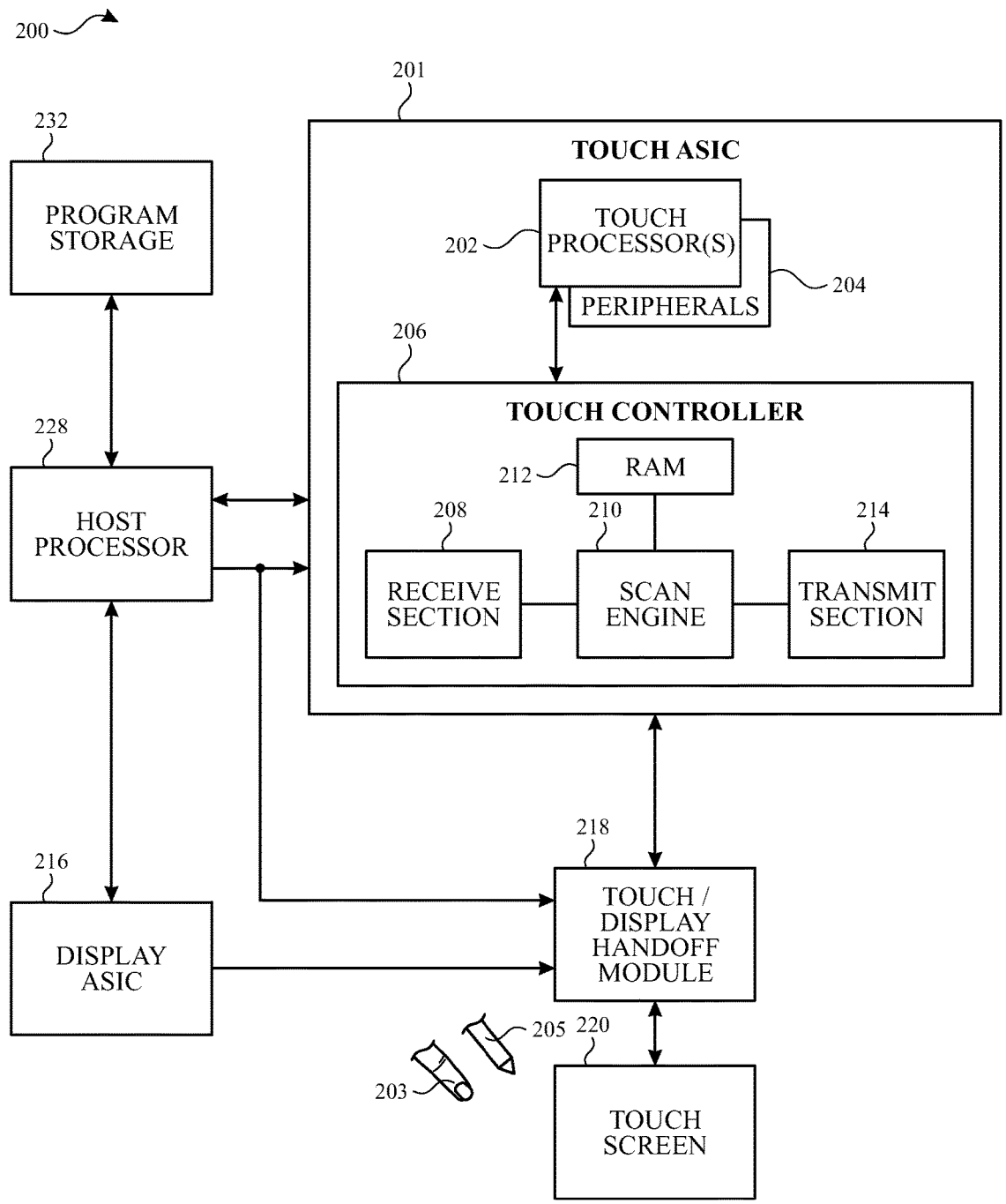
FIG. 2 illustrates a block diagram of an example computing system capable of implementing a synchronization scheme to synchronize display functions and various touch and/or stylus sensing functions of a touch screen according to examples of the disclosure.

FIG. 2 illustrates a block diagram of an example computing system 200 capable of implementing a synchronization scheme to synchronize display functions and various touch and/or stylus sensing functions of touch screen 220 according to examples of the disclosure. Computing system 200 could be included in, for example, mobile telephone 136, digital media player 140, personal computer 144, tablet computing device 148, wearable device, or any mobile or non-mobile computing device that includes a touch screen. Computing system 200 can include an integrated touch screen 220 to display images and to detect touch and/or proximity (e.g., hover) events from an object (e.g., finger 203 or active or passive stylus 205) at or proximate to the surface of the touch screen 220. Computing system 200 can also include an application specific integrated circuit ("ASIC") illustrated as touch ASIC 201 to perform touch and/or stylus sensing operations. Touch ASIC 201 can include one or more touch processors 202, peripherals 204, and touch controller 206. Touch ASIC 201 can be coupled to touch sensing circuitry of touch screen 220 to perform touch and/or stylus sensing operations (described in more detail below). Peripherals 204 can include, but are not limited to, random access memory (RAM) or other types of memory or storage, watchdog timers and the like. Touch controller 206 can include, but is not limited to, one or more sense channels in receive section 208, panel scan engine 210 (which can include channel scan logic) and transmit section 214 (which can include analog or digital driver logic). In some examples, the transmit section 214 and receive section 208 can be reconfigurable by the panel scan engine 210 based the scan event to be executed (e.g., mutual capacitance row-column scan, mutual capacitance row-row scan, mutual capacitance column-column scan, row self-capacitance scan, column self-capacitance scan, touch spectral analysis scan, stylus spectral analysis scan, stylus scan, etc.). Panel scan engine 210 can access RAM 212, autonomously read data from the sense channels and provide control for the sense channels. The touch controller 206 can also include a scan plan (e.g., stored in RAM 212) which can define a sequence of scan events to be performed at the touch screen. The scan plan can include information necessary for configuring or reconfiguring the transmit section and receive section for the specific scan event to be performed. Results (e.g., touch signals or touch data) from the various scans can also be stored in RAM 212. In addition, panel scan engine 210 can provide control for transmit section 214 to generate stimulation signals at various frequencies and/or phases that can be selectively applied to drive regions of the touch sensing circuitry of touch screen 220. Touch controller 206 can also include a spectral analyzer to determine low noise frequencies for touch and stylus scanning. The spectral analyzer can perform spectral analysis on the scan results from an unstimulated touch screen. Although illustrated in FIG. 2 as a single ASIC, the various components and/or functionality of the touch ASIC 201 can be implemented with multiple circuits, elements, chips, and/or discrete components.

Computing system 200 can also include an application specific integrated circuit illustrated as display ASIC 216 to perform display operations. Display ASIC 216 can include hardware to process one or more still images and/or one or more video sequences for display on touch screen 220. Display ASIC 216 can be configured to generate read memory operations to read the data representing the frame/video sequence from a memory (not shown) through a memory controller (not shown), for example. Display ASIC 216 can be configured to perform various processing on the image data (e.g., still images, video sequences, etc.). In some examples, display ASIC 216 can be configured to scale still images and to dither, scale and/or perform color space conversion on the frames of a video sequence. Display ASIC 216 can be configured to blend the still image frames and the video sequence frames to produce output frames for display. Display ASIC 216 can also be more generally referred to as a display controller, display pipe, display control unit, or display pipeline. The display control unit can be generally any hardware and/or firmware configured to prepare a frame for display from one or more sources (e.g., still images and/or video sequences). More particularly, display ASIC 216 can be configured to retrieve source frames from one or more source buffers stored in memory, composite frames from the source buffers, and display the resulting frames on touch screen 220. Accordingly, display ASIC 216 can be configured to read one or more source buffers and composite the image data to generate the output frame.

Display ASIC 216 can provide various control and data signals to the display, including timing signals (e.g., one or more clock signals) and/or vertical blanking period and horizontal blanking interval controls. The timing signals can include a pixel clock that can indicate transmission of a pixel. The data signals can include color signals (e.g., red, green, blue). The display ASIC 216 can control the touch screen 220 in real-time, providing the data indicating the pixels to be displayed as the touch screen is displaying the image indicated by the frame. The interface to such a touch screen 220 can be, for example, a video graphics array (VGA) interface, a high definition multimedia interface (HDMI), a digital video interface (DVI), a LCD interface, a plasma interface, or any other suitable interface.

In some examples, a handoff module 218 can also be included in computing system 200. Handoff module 218 can be coupled to the touch ASIC 201, display ASIC 216, and touch screen 220, and can be configured to interface the touch ASIC 201 and display ASIC 216 with touch screen 220. The handoff module 212 can appropriately operate the touch screen 220 according to the scanning/sensing and display instructions from the touch ASIC 201 and the display ASIC 216.

Touch screen 220 can have a variable refresh rate display. Touch screen 220 can use liquid crystal display (LCD) technology, light emitting polymer display (LPD) technology, organic LED (OLED) technology, or organic electro luminescence (OEL) technology, although other display technologies can be used in other examples. In some examples, the touch sensing circuitry and display circuitry of touch screen 220 can be stacked on top of one another. For example, a touch sensor panel can cover some or all of a surface of the display (e.g., fabricated one on top of the next in a single stack-up or formed from adhering together a touch sensor panel stack-up with a display stack-up). In other examples, the touch sensing circuitry and display circuitry of touch screen 220 can be partially or wholly integrated with one another. The integration can be structural and/or functional. For example, some or all of the touch sensing circuitry can be structurally in between the substrate layers of the display (e.g., between two substrates of a display pixel cell). Portions of the touch sensing circuitry formed outside of the display pixel cell can be referred to as "on-cell" portions or layers, whereas portions of the touch sensing circuitry formed inside of the display pixel cell can be referred to as "in cell" portions or layers. Additionally, some electronic components can be shared, and used at times as touch sensing circuitry and at other times as display circuitry. For example, in some examples, common electrodes can be used for display functions during active display refresh and can be used to perform touch sensing functions during touch sensing periods. A touch screen stack-up sharing components between sensing functions and display functions can be referred to as an in-cell touch screen.

Computing system 200 can also include a host processor 228 coupled to the touch ASIC 201, and can receive outputs from touch ASIC 201 (e.g., from touch processor 202 via a communication bus, such as an serial peripheral interface (SPI) bus, for example) and performing actions based on the outputs. Host processor 228 can also be connected to program storage 232 and display ASIC 216. Host processor 228 can, for example, communicate with display ASIC 216 to generate an image on touch screen 220, such as an image of a user interface (UI), and can use touch ASIC 201 (including touch processor 202 and touch controller 206) to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Computing system 200 can include one or more processors, which can execute software or firmware implementing and synchronizing display functions and various touch and/or stylus sensing functions according to examples of the disclosure. Specifically, for integrated touch screens which share components between touch and/or stylus sensing and display functions, the touch ASIC and display ASIC can be synchronized so as to properly share the circuitry of the touch sensor panel. The one or more processors can include one or more of the one or more touch processors 202, a processor in display ASIC 216, and/or host processor 228. In some examples, the display ASIC 216 and host processor 228 can be integrated into a single ASIC, though in other examples, the host processor 228 and display ASIC 216 can be separate circuits coupled together. In some examples, host processor 228 can act as a master circuit and can generate synchronization signals that can be used by one or more of the display ASIC 216, touch ASIC 201 and handoff module 218 to properly perform sensing and display functions for an in-cell touch screen 220. The synchronization signals can be communicated directly from the host processor 228 to one or more of the display ASIC 216, touch ASIC 201 and handoff module 218. Alternatively, the synchronization signals can be communicated indirectly (e.g., touch ASIC 201 or handoff module 218 can receive the synchronization signals via the display ASIC 216).

Computing system 200 can also include a wireless module (not shown). The wireless module can implement a wireless communication standard such as a WiFi®, BLUETOOTH™ or the like. The wireless module can be coupled to the touch ASIC 201 and/or host processor 228. The touch ASIC 201 and/or host processor 228 can, for example, transmit scan plan information, timing information, and/or frequency information to the wireless module to enable the wireless module to transmit the information to an active stylus, for example (i.e., a stylus capable generating and injecting a stimulation signal into a touch sensor panel). For example, the computing system 200 can transmit frequency information indicative of one or more low noise frequencies the stylus can use to generate a stimulation signals. Additionally or alternatively, timing information can be used to synchronize the stylus 205 with the computing system 200, and the scan plan information can be used to indicate to the stylus 205 when the computing system 200 expects a stylus scan (e.g., to save power by generating a stimulus only during a stylus scan period). In some examples, the wireless module can also receive information from peripheral devices, such as an active stylus 205, which can be transmitted to the touch ASIC 201 and/or host processor 228. In other examples, the wireless communication functionality can be incorporated in other components of computing system 200, rather than in a dedicated chip.

Note that one or more of the functions described herein can be performed by firmware stored in memory and executed by the touch processor in touch ASIC 201, or stored in program storage and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

It is to be understood that the computing system 200 is not limited to the components and configuration of FIG. 2, but can include other or additional components in multiple configurations according to various examples. Additionally, the components of computing system 200 can be included within a single device, or can be distributed between multiple devices.

Figure 3:
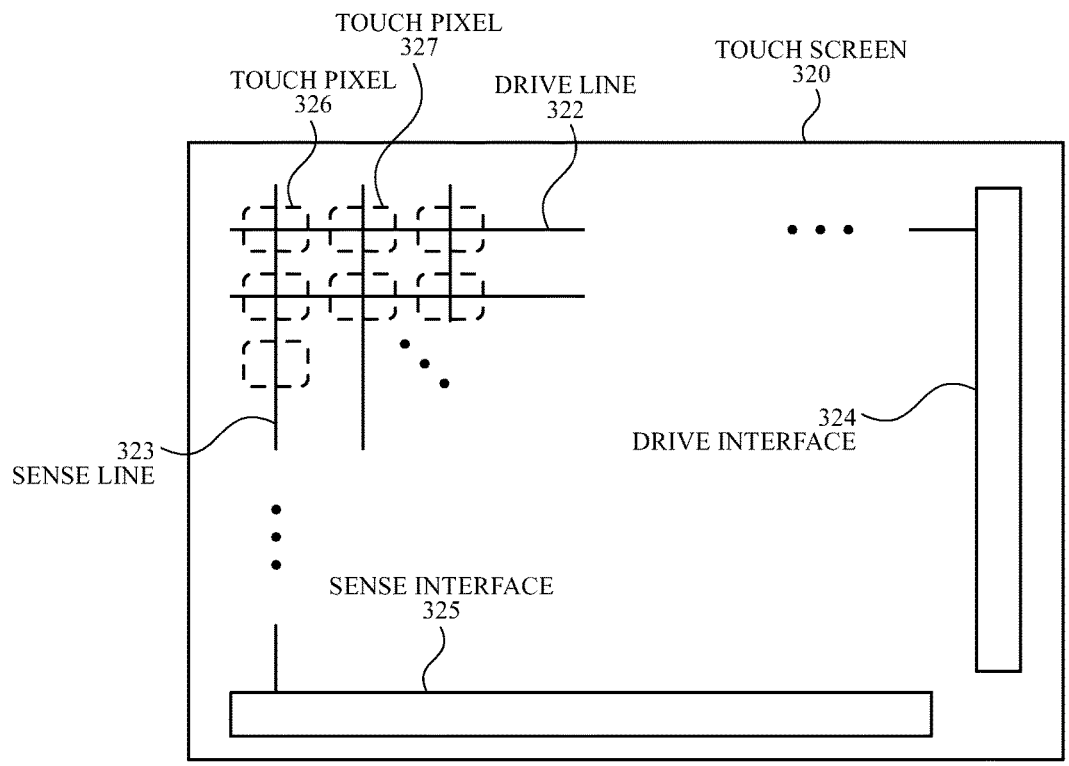
FIG. 3 illustrates an example touch screen including touch sensing circuitry configured as drive and sense regions or lines according to examples of the disclosure.

As discussed above, the touch screen 220 can include touch sensing circuitry. FIG. 3 illustrates an example touch screen including touch sensing circuitry configured as drive and sense regions or lines according to examples of the disclosure. Touch screen 320 can include touch sensing circuitry that can include a capacitive sensing medium having a plurality of drive lines 322 and a plurality of sense lines 323. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Additionally, the drive lines 322 and sense lines 323 can be formed from smaller electrodes coupled together to form drive lines and sense lines. Drive lines 322 can be driven by stimulation signals from the transmit section 214 through a drive interface 324, and resulting sense signals generated in sense lines 323 can be transmitted through a sense interface 325 to sense channels in receive section 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 326 and 327. This way of understanding can be particularly useful when touch screen 320 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g., a pattern of fingers or other objects touching the touch screen).

It should be understood that the row/drive and column/sense associations can be exemplary, and in other examples, columns can be drive lines and rows can be sense lines. In some examples, row and column electrodes can be perpendicular such that touch nodes can have x and y coordinates, though other coordinate systems can also be used, and the coordinates of the touch nodes can be defined differently. It should be understood that touch screen 220 can include any number of row electrodes and column electrodes to form the desired number and pattern of touch nodes. The electrodes of the touch sensor panel can be configured to perform various scans including some or all of row-column and/or column-row mutual capacitance scans, self-capacitance row and/or column scans, row-row mutual capacitance scans, column-column mutual capacitance scans, and stylus scans.

Figure 4:
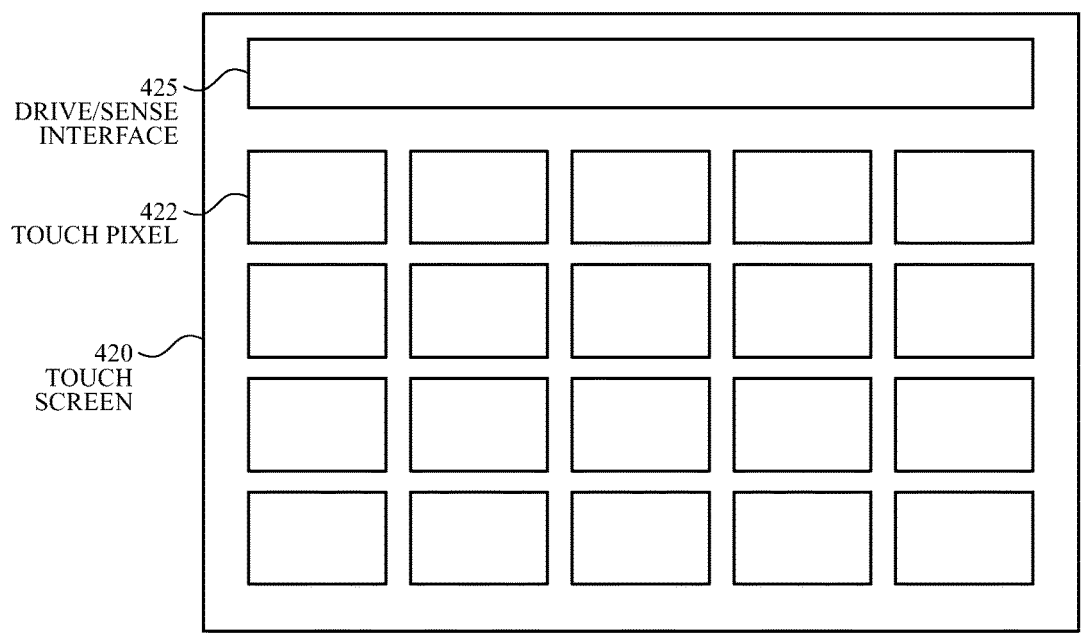
FIG. 4 illustrates an example touch screen including touch sensing circuitry configured with self-capacitance electrodes according to examples of the disclosure.

Additionally or alternatively, the touch screen can include self-capacitance touch sensing circuitry including an array of self-capacitance electrodes. FIG. 4 illustrates an example touch screen including touch sensing circuitry configured with self-capacitance electrodes according to examples of the disclosure. Touch screen 420 can include touch sensing circuitry that can include a capacitive sensing medium having a plurality of electrically isolated touch pixel electrodes 422 (e.g., a pixelated self-capacitance touch screen). Touch pixel electrodes 422 can be coupled to sense channels in receive section 208 in touch controller 206, can be driven by stimulation signals from the sense channels (or transmit section 214) through drive/sense interface 425, and can be sensed by the sense channels through the drive/sense interface as well, as described above. Labeling the conductive plates used to detect touch (i.e., touch pixel electrodes 422) as "touch pixel" electrodes can be particularly useful when touch screen 420 is viewed as capturing an "image" of touch. In other words, after touch controller 206 has determined an amount of touch detected at each touch pixel electrode 422 in touch screen 420, the pattern of touch pixel electrodes in the touch screen at which a touch occurred can be thought of as an "image" of touch (e.g., a pattern of fingers or other objects touching the touch screen).

Figure 5:
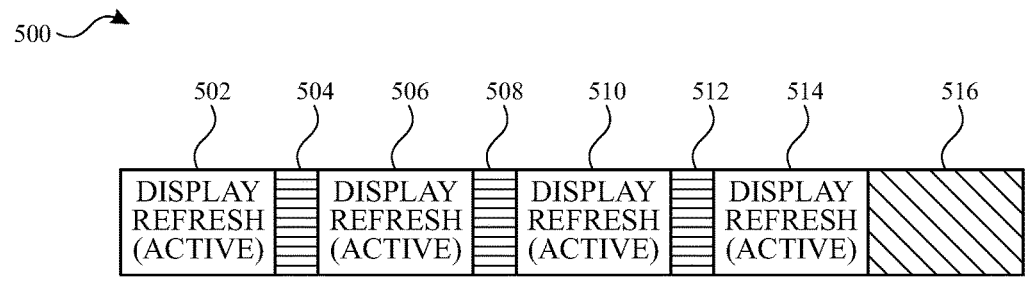
FIG. 5 illustrates an example frame timing diagram for a display according to examples of the disclosure.

In a system with a fixed refresh rate display, the various sensing operations can be timed to occur during specific display operations to reduce interference. FIG. 5 illustrates an example frame timing diagram for a display according to examples of the disclosure. The vertical components of a single frame 500 can include display active periods 502, 506, 510 and 514 separated by intra-frame blanking periods 504, 508 and 512. The frame 500 can conclude with a vertical blanking period 516. It should be noted that the number of display active periods and intra-frame blanking periods illustrated in FIG. 5 are only representative, and additional or fewer display active periods and intra-frame blanking periods can be implemented for a frame. Additionally, the order and arrangement of display active refresh periods, intra-frame blanking periods and vertical blanking period in frame 500 illustrated in FIG. 5 can be different (e.g., begin with vertical blanking rather than end with vertical blanking). In some examples, the vertical blanking period 516 and the intra-frame blanking periods 504, 508 and 512 can be chosen to have the same duration, though in other examples the duration of vertical blanking 516 can be longer than intra-frame blanking. The location of vertical blanking period 516 and the intra-frame blanking periods 504, 508 and 512 can be chosen such that they are spaced at fixed, regular intervals in time so that touch and stylus sensing scans can be performed at a constant frequency.

In systems that time-multiplex the performance of touch and/or stylus sensing functions and display functions (e.g., because of shared circuitry or to reduce interference between different functions), the touch and/or stylus sensing functions can be performed during the intra-frame blanking periods. Some of the touch screen, or the entire touch screen can be scanned during each of the intra-frame blanking periods. For example, as illustrated in FIG. 5, mutual capacitance touch scans can be performed on a portion of a touch sensor panel to detect one or more fingers during each of blanking periods 504, 508, 512 and 516, so as to scan the entire touch screen during the frame 500. In such an example, the touch scanning rate can match the display frame rate (e.g., both can have a 60 Hz or 120 Hz rate). In other examples, the touch scanning rate can be increased or decreased relative to the display frame rate. The touch or stylus sensing scanning frequency can be doubled by scanning the entire touch screen twice during a display frame or quadrupled by scanning the entire touch screen during each blanking period in FIG. 5. Alternatively, the touch or stylus sensing rate can be reduced by scanning only a portion of the touch screen during a display frame. As discussed herein, it can be desirable in some examples for touch sensing and display operation to occur at the same rate in order to reduce any mismatch or latency between the content displayed on the screen and the corresponding touch sensing data.

Although touch and stylus scans are discussed, other sensor scans can require synchronization with the display intra-frame and vertical blanking periods. Additionally, although discussed in terms of intra-frame blanking periods and vertical blanking periods, these periods are examples of pauses in a frame when the display is not in active refresh (e.g., idle), and can be referred to as intra-frame pauses (IFPs).

In order to synchronize the touch and/or stylus sensing functions with the display, synchronization signals can be generated (e.g., by host processor 228) which can be used by the display system (e.g., display ASIC 216 and/or handoff module 218) to pause the display refresh, and can be used by the touch system (e.g., touch ASIC 201 and/or handoff module 218) to perform the appropriate touch and/or stylus sensing scan. For example, a first synchronization signal can be logic high (or logic low) to indicate intra-frame blanking periods, and a second synchronization signal can be logic high (or logic low) to indicate vertical blanking (i.e. blanking period at the start or end of a display frame and/or sub-frame) and/or extended blanking periods. The first and second synchronization signals can be used, for example, to synchronize the display blanking periods with scans requiring low noise for improved performance. A third synchronization signal can be logic high (or logic low) to indicate a period of extended blanking. A fourth synchronization signal can be logic high (or logic low) to indicate a period of vertical blanking (not including extended blanking). The synchronization signals together can effectively represent the appropriate operating mode for the display and touch systems. Although four synchronization signals are described above, alternative synchronization signals can be used (e.g., encoding the state using fewer synchronization signals or a state machine).

In some cases, one or more synchronization signals can be implemented as a pre-warning signal to inform the touch ASIC 201 of an upcoming beginning and/or end of an extended blanking period corresponding to a modified display refresh rate. In other words, one or more synchronization signals can toggle early (e.g., to logic high or logic low) in order to give the touch ASIC 201 advanced warning to implement (e.g., by reprogramming touch controller 206) touch and/or stylus scans appropriate for an extended blanking period and the frames/sub-frames that follow the extended blanking period. The synchronization signals can also be used to prepare the display ASIC 216 for display refresh in the display frame after extending blanking periods.

It should be noted that during an extended blanking period, the touch and/or stylus scans can be performed at any time, as no active display refresh operations can be occurring. Nonetheless, "fake" synchronization signals (e.g., signals which are not actually used to synchronize) can continue to be sent during this period to the touch ASIC 201 which can be expecting such signals to perform sensing scans.

Figure 6:
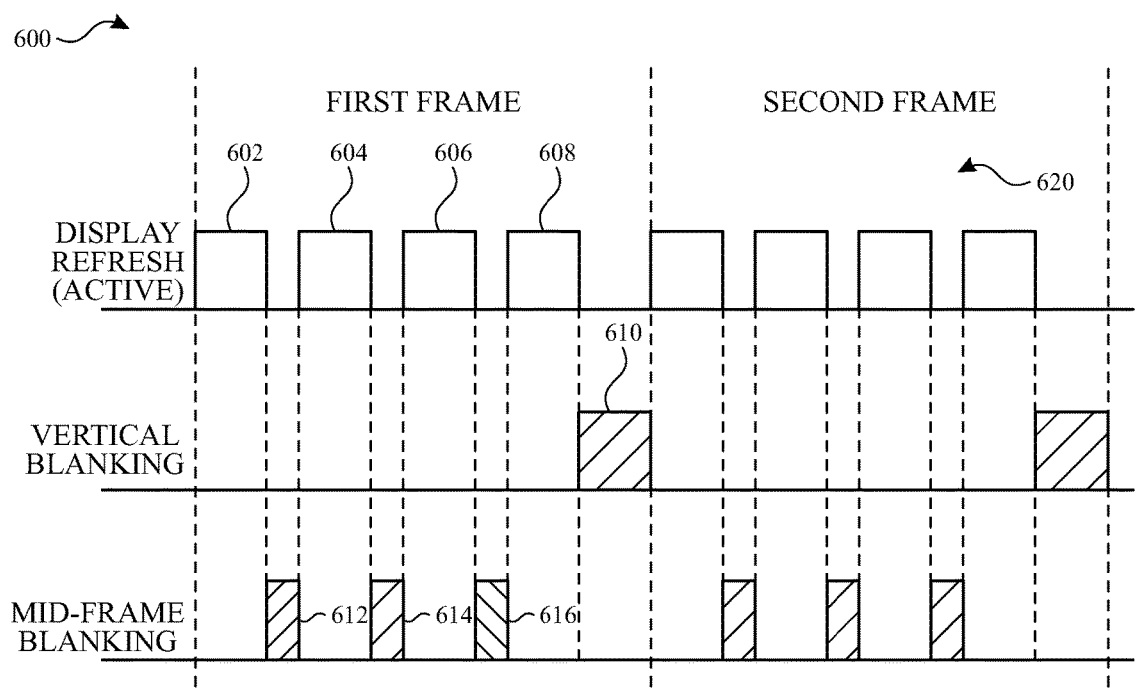
FIG. 6 illustrates an example two-frame timing diagram for a display according to examples of the disclosure.

FIG. 6 illustrates an example two-frame timing diagram for a display according to examples of the disclosure. The pixels of the first frame 600 can be driven in four separate active refresh periods 602, 604, 606 and 608. A portion of the first frame (i.e., image to be displayed) can be written to the display during each of the active refresh periods. The active refresh periods 602, 604, 606 and 608 can be separated by intra-frame blanking periods 612, 614, and 616. During the intra-frame blanking periods, the display controller can temporarily stop driving display pixels to the display. In some examples, dummy pixels can be generated by the display controller instead of actual pixels. Similarly, during the vertical blanking period 610 at the end of the first frame, no pixels can be driven to the display. The same timing of active display refresh (i.e., driving), intra-frame blanking periods, and vertical blanking periods for the first frame can be continued for the second frame. This pattern of frame timing can continue until necessitated by a change in the scanning and display behavior of the system.

Figures 7A, 7B:
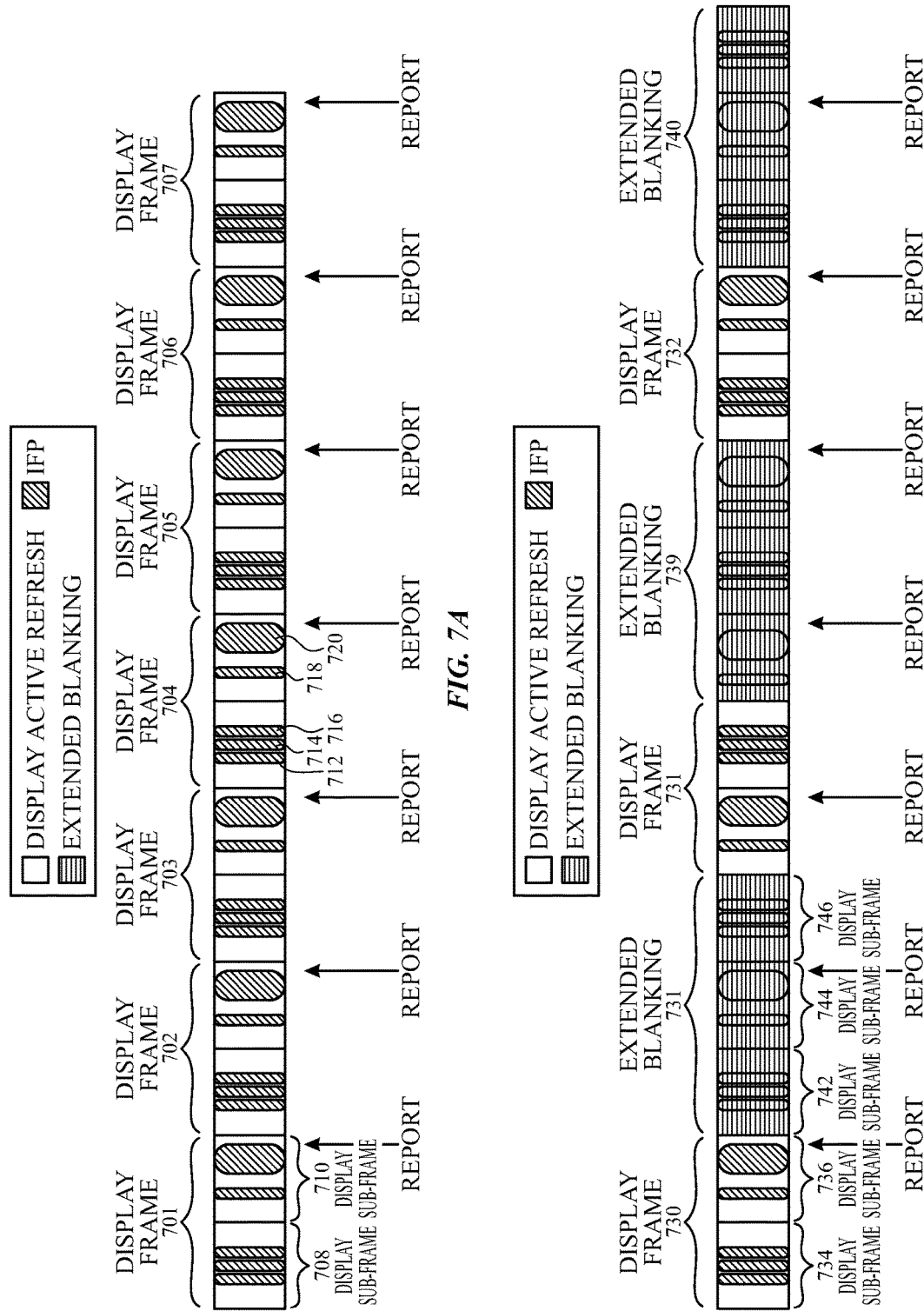
FIG. 7A illustrates an example timing diagram for synchronizing sensing operations with display operations according to examples of the disclosure.
FIG. 7B illustrates an example timing diagram for synchronizing sensing operations with display operations for a variable refresh rate display according to examples of the disclosure.

To ensure proper synchronization of sensing and display operations and the proper processing of data generated by the sensing operations corresponding to the displayed images, various timing schemes can be employed. FIG. 7A illustrates an example timing diagram for synchronizing sensing operations with display operations according to examples of the disclosure. The example illustrated in FIG. 7A can correspond to a continuous-touch mode (e.g., touch scans performed during each display frame) with a fixed display refresh rate (e.g., 60 Hz, 120 Hz, etc.). FIG. 7A illustrates seven display frames 701-707. In some examples, one or more display frames can include multiple display sub-frames. For example, display frame 701 includes two display sub-frames 708 and 710. Although two sub-frames are illustrated, a display frame can be divided into a different number of sub-frames. A display frame and/or a display sub-frame can include one or more IFPs. For example, the first display sub-frame of display frame 704 can include IFPs 712, 714 and 716, and the second display sub-frame of display frame 704 can include IFPs 718 and 720. The number, arrangement, and duration of IFPs can be the same or different within or between display sub-frames.

During the IFPs the display refresh can be paused and one or more sensing scans can be performed. For example, a touch sensing scan (e.g., a scan of the touch screen to sense one or more objects such as a finger or passive stylus) can be divided into scan steps so that a portion of the touch screen can be scanned during some or all of the IFPs in a display frame or sub-frame. If the touch sensing scan of the touch screen is performed once during a display frame, the touch scanning rate and the display frame rate can be the same. If the touch sensing scan of the touch screen is performed once during each of two sub-frames of a display frame, the touch scanning rate can be double the display frame rate. In some examples, a stylus sensing scan can be performed during one or more IFPs to sense an active stylus. Like the touch sensing scan, the stylus sensing scan can be divided into scan steps (e.g., to scan some or all of the row electrodes during a step and to scan some or all of the column electrodes of a touch screen during another step). If the stylus sensing scan of the touch screen is performed once during a display frame, the stylus scanning rate and the display frame rate can be the same. If the stylus sensing scan of the touch screen is performed once or twice during each of two sub-frames of a display frame, the stylus scanning rate can be double or quadruple the display frame rate.

The data generated from the touch and/or stylus sensing scans can be reported (e.g., from the touch ASIC 201 to the host processor 228) at various intervals for processing. For example, in the example illustrated in FIG. 7A, data can be reported at or proximate to the conclusion of a display frame. Because the display refresh rate is fixed, data can be reported at regular intervals to simplify processing.

Some displays can support a variable refresh rate. A variable refresh rate can be generated by inserting a period of extended blanking (i.e., no active refresh) between two display frames. The duration of the extended blanking can depend on the desired refresh rate. For example, in a system with a 60 Hz display frame, adding a 60 Hz frame of extended blanking can change the display refresh rate to 30 Hz (i.e., refresh the display once every two display frame periods), and adding two 60 Hz frames of extended blanking can change the display refresh rate to 20 Hz (i.e., refresh the display once every 3 display frame periods). In other examples, a system can have a 120 Hz display frame. Adding a 120 Hz frame (or two sub-frames) of extended blanking can change the display refresh rate to 60 Hz, adding three sub-frames of extended blanking can change the display refresh rate to 48 Hz and adding four sub-frames of extended blanking can change the display refresh rate to 40 Hz. It should be understood that the available frame refresh rates can depend on a default frame rate and the number of blanking frames. Additionally, in other examples, extended blanking of a duration corresponding to one or more sub-frames (or any other duration), rather than an integer number of display frames can be inserted between display frames. The display frame can be divided into a different number of sub-frames depending, for example, on the desired flexibility of variable refresh rates. For example, one sub-frame of extended blanking can reduce the display refresh rate from 60 Hz to 48 Hz. Similarly, two sub-frames of extended blanking can reduce the display refresh rate from 60 Hz to 40 Hz. Increasing the number of sub-frames can increase the range and granularity of the available variable refresh rates.

FIG. 7B illustrates an example timing diagram for synchronizing sensing operations with display operations for a variable refresh rate display according to examples of the disclosure. The example illustrated in FIG. 7B can correspond to a continuous-touch mode with a variable refresh rate display. FIG. 7B illustrates three display frames 730-732 (each divided into two sub-frames 734 and 736) followed by three sub-frame periods of extended blanking 738-740. For example, if display frame 730 corresponds to a 120 Hz frame, the effective refresh rate of display frame 730 and three sub-frames of extended blanking 738 can be 48 Hz. For simplicity, the IFPs and corresponding scanning operation for the display frame 701 in FIG. 7A can be similar to the IFPs and corresponding scanning operation for the display frame 730 in FIG. 7B. During periods of extended blanking, the touch and/or stylus sensing scans can continue in the same pattern as during a display frame. For example, during the first sub-frame period 742 of extended blanking 738, the touch system can perform the same scanning operation as the first sub-frame 734 of display frame 730. During the second sub-frame period 744 of extended blanking 738, the touch system can perform the same scanning operation as the second sub-frame 736 of display frame 730. During the third sub-frame period 746 of extended blanking 738, the touch system can perform the same scanning operation as the first sub-frame 736 of display frame 730. The pattern of IFPs and corresponding sensing scans can continue for subsequent sub-frames. Like in FIG. 7A, the touch system can continue to report data from the sensing operation at a regular interval (e.g., every two sub-frames). For example, reporting events can occur at the end of display sub-frame 730 (i.e., after sub-frames 724 and 726), after sub-frames 742 and 744 of extended blanking 738, etc. As a result of using an odd number of extended blanking sub-frames, reporting events can sometimes occur at the conclusion of a display frame—as at the conclusion of display frame 730—and can sometimes occur during a display frame—as in the middle of display frame 731.

Figure 7C:
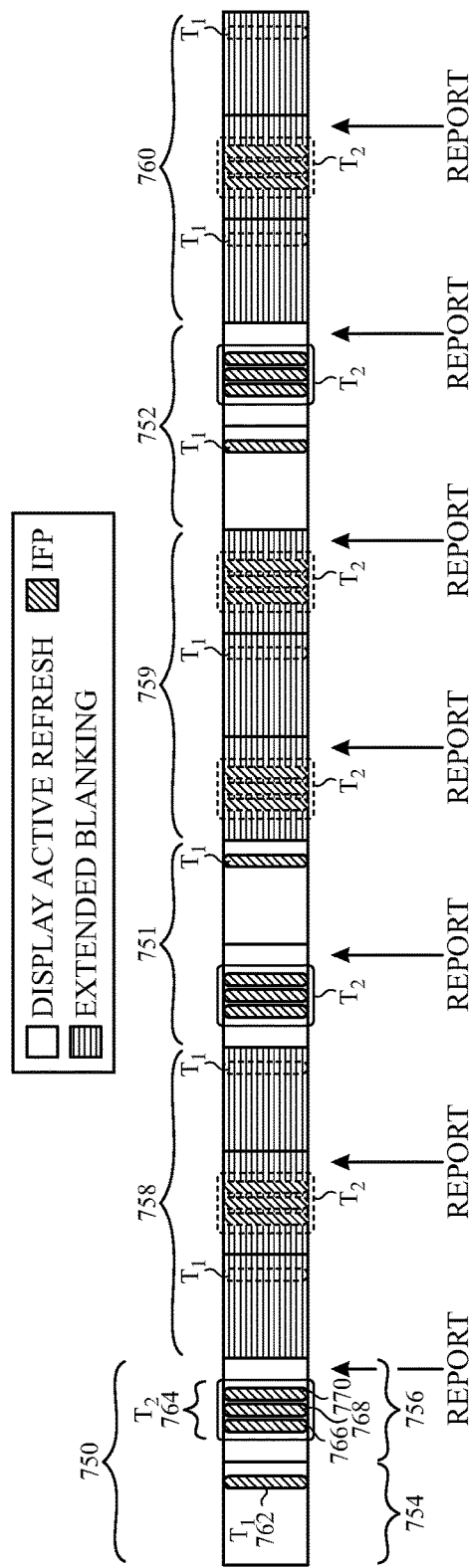
FIG. 7C illustrates another example timing diagram for synchronizing sensing operations with display operations for a variable refresh rate display according to examples of the disclosure.

FIG. 7C illustrates another example timing diagram for synchronizing sensing operations with display operations for a variable refresh rate display according to examples of the disclosure. FIG. 7C, like FIG. 7B, illustrates three display frames 750-752 (each divided into two sub-frames, e.g., 754 and 756) followed by three sub-frame periods of extended blanking 758-760. FIG. 7C, however, illustrates a different arrangement of IFPs for the display sub-frames. Sub-frame 754 can include a single IFP 762 (labeled "$T_1$"), which can correspond to a stylus sensing scan, for example. Sub-frame 756 can include three IFPs 766, 768, and 770 (collectively labeled "$T_2$"), which can correspond to a stylus sensing scan and a touch sensing scan. For example, one of the three IFPs can correspond to execution of a stylus sensing scan (much like $T_1$) and the remaining two IFPs can correspond to execution of a touch sensing scan. In some examples, instead of three separate IFPs, $T_2$ can include a single IFP 764. Merging multiple IFPs into a single IFP can reduce the number of times the display refresh starts and pauses, thereby reducing the complexity of the system and reducing power consumption due to switching the display link on and off.

Operating in a continuous-touch mode with a variable refresh rate display, as illustrated in FIGS. 7B and 7C can result in frame judder. Unlike in the case of a continuous-touch mode with a fixed refresh rate (or even in the case of a variable refresh rate display with an even number of sub-frame periods of extended blanking), in FIGS. 7B and 7C, sensing data is reported in the middle of a display frame (i.e., display frames 731 and 751, respectively) rather than at the end of a display frame (e.g., like display frames 730, 732, 750, 752) because reporting touch scans are no longer synchronized with display frames. Additionally, FIG. 7B illustrates reporting events twice during display frame 730 and extended blanking 738 or display frame 732 and extended blanking 740, and three reporting events can occur during display frame 731 and extended blanking 739. Likewise, FIG. 7C illustrates reporting events twice during display frame 750 and extended blanking 758 or display frame 752 and extended blanking 760, and three reporting events can occur during display frame 751 and extended blanking 759. This different number of samples reported for different corresponding images can complicate the processing of reported data and can also be related to frame judder that can occur when using such a timing scheme.

In some examples, the mismatch or variable latency that can cause frame judder can be corrected or reduced in software or firmware. Data reported from sensing scans can be time-stamped to include a timing parameter indicative of the timing of the sensing scan data. The data can then be processed to associate the sensing scan data with the appropriate display frame and image. The data along with time-stamps can be used to generate touch information corresponding to the expected reporting time. For example, interpolation (e.g., linear or non-linear) using the time-stamps can be used to process touch sensing data to estimate a touch location corresponding to an expected reporting time. Other forms of interpolation or other estimation techniques can be used to estimate the touch location at an expected time using time-stamped touch sensing scan data.

Figure 8A:
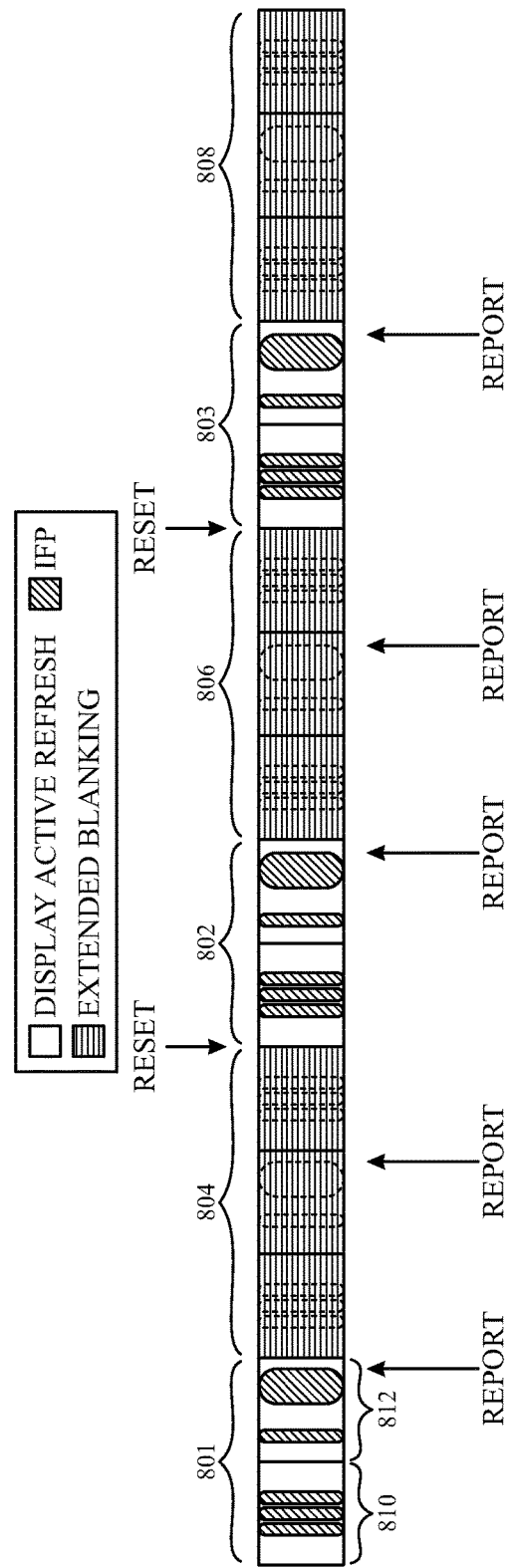
FIG. 8A illustrates an example timing diagram for synchronizing, via a reset, sensing operations with display operations for a variable refresh rate display according to examples of the disclosure.

In other examples, the variable latency or mismatch problems can be resolved by resetting the sensing and/or display operations after extended blanking, and in the process, dropping some touch and/or stylus sensing scan data. FIG. 8A illustrates an example timing diagram for synchronizing, via a reset, sensing operations with display operations for a variable refresh rate display according to examples of the disclosure. FIG. 8A illustrates three display frames 801-803 (each divided into two sub-frames 810 and 812) followed by three sub-frame periods of extended blanking 804, 806 and 808. FIG. 8A mostly follows the synchronization scheme and timing of FIG. 7B, and for simplicity only the discussion of resetting the display and scans and dropping sensing scan data will be discussed. After N sub-frames of extended blanking, the display and touch and/or stylus scanning operations can be reset. As illustrated in FIG. 8A, at the end of the last sub-frame of extended blanking periods 804, 806 and 808 (e.g., in response to a synchronization signal corresponding to the end of extended blanking), the display can begin the display refresh processes for a display frame and also reset the sensing scans. As a result, the sensing scans for the sub-frames of display frames 801-803 can be the same, in contrast to the timing shown in FIG. 7B, where display frame 731 can have different IFPs and corresponding sensing scans than display frames 730 and 732. The touch and/or stylus data from the last sub-frame of extended blanking period 804 can be discarded and the reporting of sensing data can occur at the end of the display frame (e.g., display frame 802) such that the touch and/or stylus scan data can be aligned with the display frames to reduce or remove any latency that can occur, though at the cost of discarding some scan data.

Figure 8B:
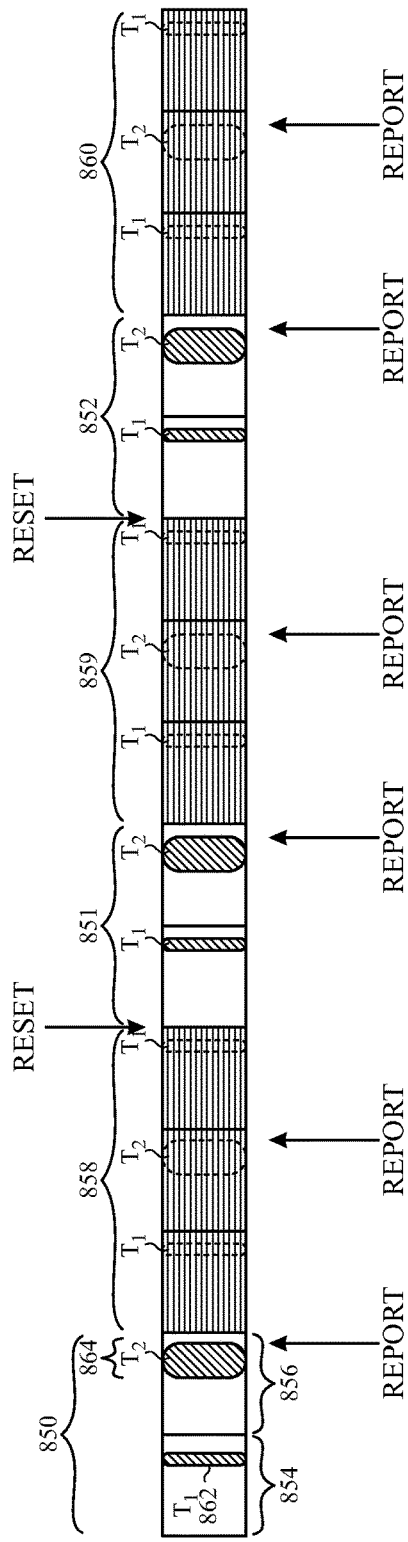
FIG. 8B illustrates another example timing diagram for synchronizing, via a reset, sensing operations with display operations for a variable refresh rate display according to examples of the disclosure.

FIG. 8B illustrates another example timing diagram for synchronizing, via a reset, sensing operations with display operations for a variable refresh rate display according to examples of the disclosure. FIG. 8B, like FIG. 8A, illustrates three display frames 850-852 (each divided into two sub-frames 854 and 856) followed by three sub-frame periods of extended blanking 858-860. FIG. 8B, however, illustrates a different arrangement of IFPs for the display sub-frames, that can correspond to the IFP arrangement of FIG. 7C. Sub-frame 854 can include a single IFP 862 (labeled "$T_1$"), which can correspond to a stylus sensing scan, for example. Sub-frame 856 can include a single IFP 864 (labeled "$T_2$"), which can correspond to a stylus sensing scan and a touch sensing scan. As illustrated in FIG. 7C, in some examples, IFP 864 can alternatively include multiple IFPs (e.g., three IFPs).

Dropping data by resetting display and/or sensing operations can resynchronize the display and sensing operations after extended blanking so as to reduce or eliminate frame judder; however, dropping data can reduce the performance of the sensing system. For example, the responsiveness of the system to touch and/or stylus can be compromised by discarding data indicative of touch and/or stylus input.

Figure 9:
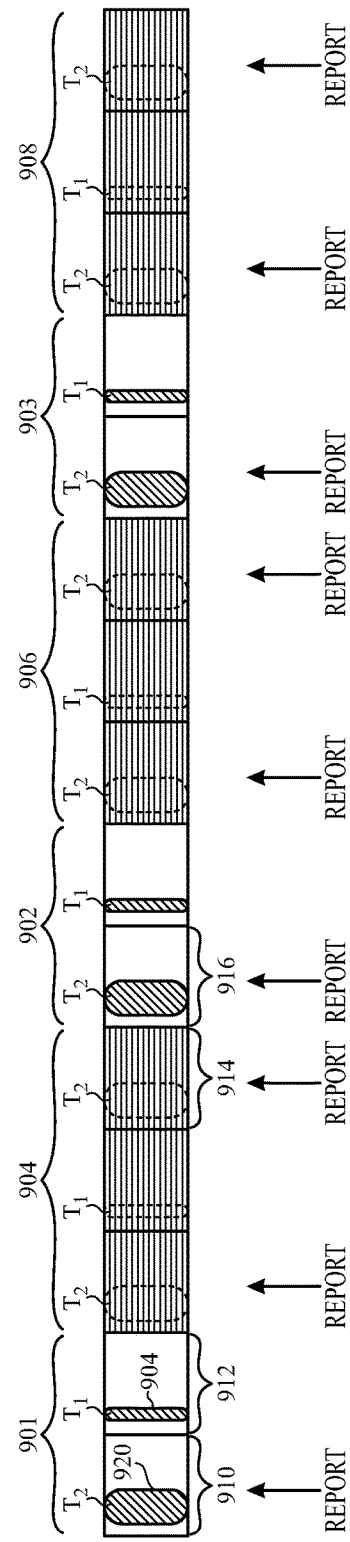
FIG. 9 illustrates an example timing diagram for synchronizing, via a reset, sensing operations with display operations for a variable refresh rate display without dropping sensing data according to examples of the disclosure.

In some examples, the variable latency or mismatch problems can be reduced or resolved without discarding data from the sensing operation after extended blanking. FIG. 9 illustrates another example timing diagram for synchronizing, via a reset, sensing operations with display operations for a variable refresh rate display without dropping sensing data according to examples of the disclosure. FIG. 9 illustrates three display frames 901-903 (each divided into two sub-frames 910 and 912) followed by three sub-frame periods of extended blanking 904, 906 and 908. Sub-frame 910 can include a single IFP 920 (labeled "$T_2$"), which can correspond to a stylus sensing scan and a touch sensing scan, for example. Sub-frame 912 can include a single IFP 922 (labeled "$T_1$"), which can correspond to a stylus sensing scan. Results of the sensing scans can be reported at or proximate to the conclusion of $T_2$. Additionally or alternatively, the report can occur at a different time during the sub-frame in which the touch sensing scan occurs. Additionally or alternatively, the results of stylus sensing scans can be reported at or proximate to the conclusion of $T_1$ and/or $T_2$.

At the conclusion of a period of extended blanking (i.e., before the beginning of the next display frame), the display and/or sensing systems can be programmed to ensure the display and sensing systems perform IFP $T_2$ and corresponding sensing scans in the first sub-frame after extended blanking. For example, the sensing system can perform a scan corresponding to IFP $T_2$ during sub-frame 914 of extended blanking period 904. Following the pattern of IFPs and sensing scans, the sensing system can, in some examples, perform sensing scans corresponding to IPF $T_1$ during the next sub-frame 916. However, in the example of FIG. 9, at the end of extended blanking, synchronization signals can be used to direct the display system to begin the display refresh operation for the coming display frame (beginning with IFP $T_2$ in the first sub-frame) and to reprogram the sensing system to perform the corresponding sensing scans corresponding to $T_2$ for the first sub-frame of the display frame.

By performing the touch sensing scan during the first sub-frame of a display frame, each display frame and corresponding extended blanking can together include the same number of samples for a given refresh rate. For example, in FIG. 9, three reporting events are performed during display frame 901 and extended blanking 904. Likewise, three reporting events are performed during display frame 902 and extended blanking period 906, and during display frame 903 and extended blanking period 908. The same number of reporting events are performed when using the default refresh rate (i.e., without extended blanking frames/sub-frames). For example, in FIG. 7A, one reporting event occurs during each of display frames 701-707. Similarly, when an even number of extended blanking sub-frames (or an integer number of extended blanking frames) is used, the number of reporting events for each display frame and corresponding extended blanking periods can be the same across different displayed images. For example, using four sub-frames of extended blanking after a display frame (rather than three sub-frames of blanking) can also result in three reporting events for the display frame and extending blanking. For the reporting described in FIG. 9, where a display frame can include two sub-frames, the number of reports per displayed image can be calculated based on the following equation:

$$\text{number of reports} = \begin{cases} \dfrac{N}{2} + 1, & \text{for } N \text{ even} \\ \dfrac{N+1}{2} + 1, & \text{for } N \text{ odd} \end{cases}$$

where N can correspond to the number of sub-frames of extended blanking.

Because the system provides for a consistent number of sensing reports for a given refresh rate, the processing of the reported data can occur continuously (i.e., without dropping data that can degrade performance) and without frame judder. When the refresh rate is changed for a system, the processing can be updated to accommodate a different number of samples, or alternatively, some samples can be ignored.

As illustrated in FIG. 9, IFP 920 can begin at the start of display frame 910. In other examples, IFP 920 can occur at a different point within the first sub-frame of the display frame following the period of extended blanking. Additionally, FIG. 9 illustrates IFPs 920 and 922 each as a single IFP, but in other examples, the sensing operations can be divided into a plurality of IFPs. Implementing fewer IFPs can reduce the number of switching events between active display refresh and not refreshing the display. Reducing the switching of the display can result in power and timing savings for the device and can reduce the complexity of the system. For example, some devices can power down a display link between the host processor and the display controller to save power when the display is not actively refreshing. The switching process itself, however, can require power expenditures greater than the power gains from disabling the link for short periods of time. Additionally, powering the display link down and back up again can require time, and therefore the display link may not be able to power down and back up again when short successive IFPs are specified. As a result, in that example, the display link remains active at the cost of potential power savings. Additionally, switching between display operation and sensing operations can require charging and discharging various circuit elements (e.g., components shared between touch sensing and display operations)

which can take time, thereby limiting the amount of time available during a display frame for display refresh and sensing operations.

Figure 10:
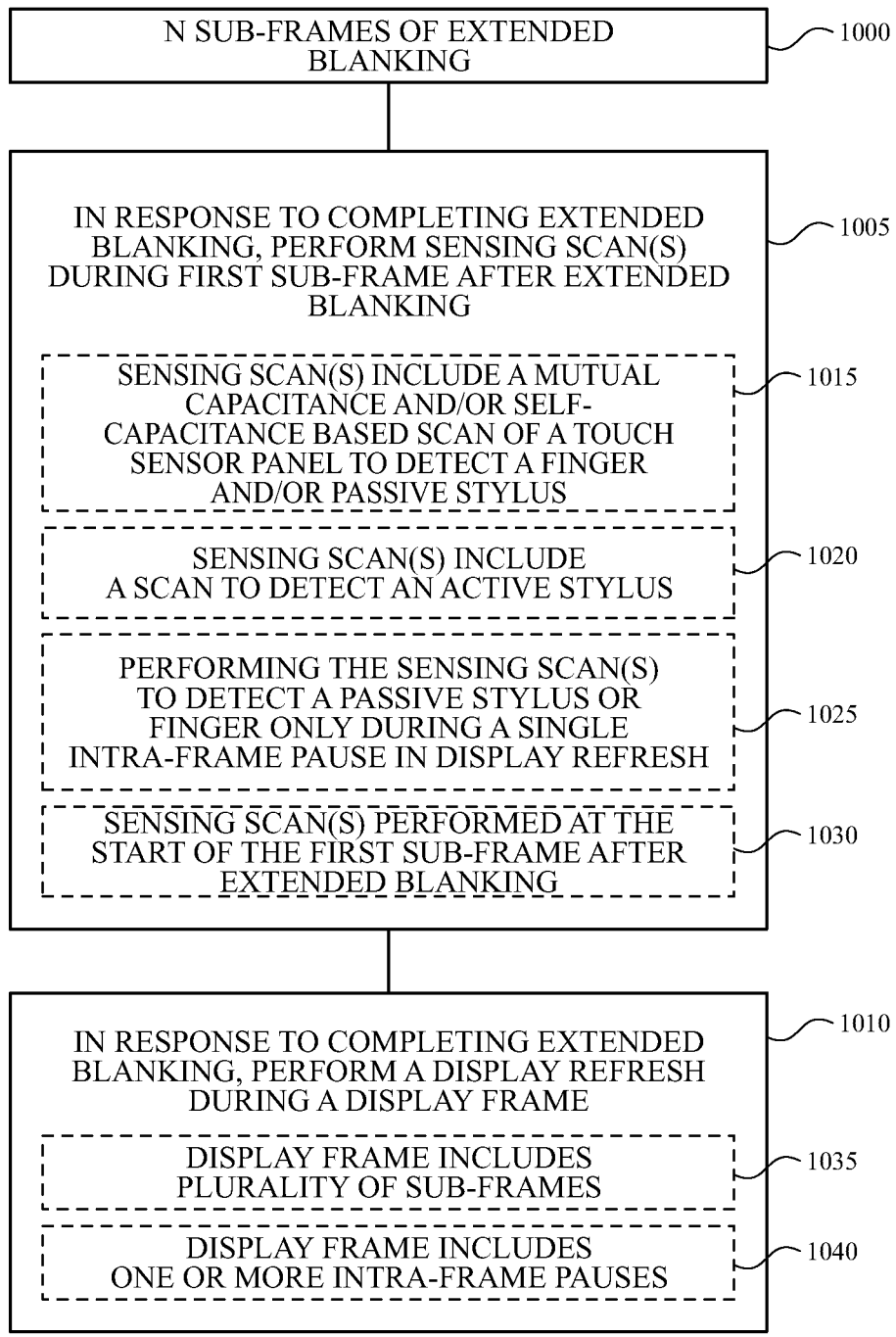
FIG. 10 illustrates an example process for synchronizing display and sensing operations according to examples of the disclosure.

FIG. 10 illustrates an example process for synchronizing display and sensing operations according to examples of the disclosure. The system can adjust the refresh rate of the display by performing extended blanking of the display for one or more frames/sub-frames (1000). At or proximate to the conclusion of the extended blanking of the display, the system can generate synchronization signals to synchronize touch and/or stylus sensing scans with the display refresh. In some examples, the synchronization signal can be generated in advance of the beginning of the upcoming display frame to give the display system and sensing system enough time to prepare for the upcoming display frame. In response to the conclusion of extended blanking (e.g., in response to receiving a synchronization signal), the system can perform one or more sensing scans during the first sub-frame of the display frame (1005) and perform a display refresh during the display frame (1010).

In some examples, the one or more sensing scans can include a mutual capacitance scan and/or a self-capacitance scan of a touch sensor panel or touch screen to detect an object (e.g., one or more fingers or a passive stylus) (1015). The mutual capacitance and/or self-capacitance sensing scans can include stimulating the touch screen or touch sensor panel to detect objects touching or hovering over the surface as described above. The one or more sensing scans can also include a stylus scan to detect an active stylus (i.e., a stylus active as a drive electrode and the electrodes of the touch sensor panel acting as sense electrodes) touching or hovering over the surface (1020). In some examples, the touch sensing scan can be performed during a single IFP in the first sub-frame of the display frame (1025). In some examples, the touch sensing scan can be performed at the start of the first sub-frame after the extended blanking period (1030). The results of the touch sensing scan can be reported to a processor for further processing. In some examples, the reporting of data can occur at or proximate to the conclusion of performing the one or more sensing scans.

The display refresh can be performed during a display frame that includes two or more display sub-frames (1035). The display frame can also include one or more IFPs during which time the display is not refreshed (1040). The one or more IFPs can occur during some or all of the display sub-frames of a display frame. The one or more sensing scans can be performed during one or more intra-frame pauses in the display refresh during the first sub-frame of the display frame.

Therefore, according to the above, some examples of the disclosure are directed to an apparatus comprising a touch screen and one or more processing circuits. The one or more processing circuits can be capable of receiving a signal indicative of an end of an extended period during which an image displayed on the touch screen is not updated, in response to receiving the signal, updating the image displayed on the touch screen during a display frame, the display frame comprising a plurality of sub-frames, and in response to receiving the signal, performing a touch scan of the touch screen during a single pause in updating the displayed image of a first sub-frame of the plurality of sub-frames. Additionally or alternatively to one or more of the examples disclosed above, the touch scan can begin at a start of the display frame. Additionally or alternatively to one or more of the examples disclosed above, in some examples only one touch scan can be performed during the display frame. Additionally or alternatively to one or more of the examples disclosed above, the results of the touch scan can be reported at the conclusion of the touch scan. Additionally or alternatively to one or more of the examples disclosed above, the one or more processing circuits can time multiplex performance of the touch scan and updating the display. Additionally or alternatively to one or more of the examples disclosed above, components of the touch screen can be shared between a display function and a touch scan function of the touch screen.

Other examples of the disclosure are directed to an apparatus comprising a touch screen and one or more processing circuits. The one or more processing circuits can be capable of receiving a signal indicative of an end of an extended period during which an image displayed on the touch screen is not updated, in response to receiving the signal, updating the image displayed on the touch screen during a display frame, the display frame comprising a plurality of sub-frames, and in response to receiving the signal, performing a touch scan of the touch screen during a pause in the updating the displayed image of a first sub-frame of the plurality of sub-frames, wherein the touch scan begins at a start of the display frame. Additionally or alternatively to one or more of the examples disclosed above, the touch scan can be performed during a single pause in the display update. Additionally or alternatively to one or more of the examples disclosed above, in some examples, only one touch scan can be performed during the display frame. Additionally or alternatively to one or more of the examples disclosed above, results of the touch scan can be reported at the conclusion of the touch scan. Additionally or alternatively to one or more of the examples disclosed above, the one or more processing circuits can time multiplex performance of the touch scan and updating the display. Additionally or alternatively to one or more of the examples disclosed above, components of the touch screen can be shared between a display function and a touch scan function of the touch screen.

Other examples of the disclosure are directed to a system comprising a touch screen and one or more processing circuits. The one or more processing circuits can be capable of receiving a signal indicative of an end of a period of extended display blanking, in response to receiving the signal, refreshing an image displayed on the touch screen during a plurality of sub-frames of a display frame, and, in response to receiving the signal, scanning the touch screen to detect an object touching or hovering over the touch screen during a first sub-frame of the plurality of sub-frames. Scanning the touch screen can occur during a first period of the display frame when the refreshing the image displayed on the touch screen is paused. Additionally or alternatively to one or more of the examples disclosed above, the first sub-frame of the plurality of sub-frames can correspond to a beginning of the display frame. Additionally or alternatively to one or more of the examples disclosed above, the first period of the display frame occurs at a start of the display frame. Additionally or alternatively to one or more of the examples disclosed above, the one or more processing circuits can be further capable of sensing an active stylus during the first period. Additionally or alternatively to one or more of the examples disclosed above, the display frame can include two sub-frames.

Other examples of the disclosure are directed to a system comprising a touch screen and one or more processing circuits. The one or more processing circuits can be capable of receiving a signal indicative of an end of a period of extended display blanking, in response to receiving the signal, refreshing an image displayed on the touch screen during a plurality of sub-frames of a display frame, in response to receiving the signal, scanning the touch screen to detect an object touching or hovering over the touch screen during a first sub-frame of the plurality of sub-frames. The first sub-frame of the plurality of sub-frames can correspond to a beginning of the display frame. Additionally or alternatively to one or more of the examples disclosed above, scanning the touch screen can occur during a first period of the display frame when the refreshing the image displayed on the touch screen is paused.

Additionally or alternatively to one or more of the examples disclosed above, the first period of the display frame occurs at a start of the display frame. Additionally or alternatively to one or more of the examples disclosed above, the one or more processing circuits can be further capable of sensing an active stylus during the first period. Additionally or alternatively to one or more of the examples disclosed above, the display frame can include two sub-frames.

Other examples of the disclosure are directed to a method executed by one or more processing circuits. The method can comprise receiving a signal indicative of an end of a period of extended display blanking, in response to receiving the signal, refreshing an image displayed on the touch screen during a plurality of sub-frames of a display frame, and in response to receiving the signal, performing one or more first sensing scans of the touch screen to detect a first type of object touching or hovering over the touch screen during a first sub-frame of the plurality of sub-frames. The one or more first sensing scans can occur during a period of the first sub-frame when refreshing the image displayed on the touch screen is paused. Additionally or alternatively to one or more of the examples disclosed above, the one or more first sensing scans can include stimulating a plurality of sensors of the touch screen to detect mutual capacitance signals or self-capacitance signals. Additionally or alternatively to one or more of the examples disclosed above, the period of the first sub-frame when refreshing the image displayed on the touch screen is paused can occur at the start of the display frame. Additionally or alternatively to one or more of the examples disclosed above, the method can further comprise performing one or more second sensing scans to detect a second type of object touching or hovering over the touch screen during one or more of the first sub-frame of the plurality of sub-frames and a second sub-frame of the plurality of sub-frames. Additionally or alternatively to one or more of the examples disclosed above, the one or more second sensing scans can include detecting signals transmitted from an active stylus. Additionally or alternatively to one or more of the examples disclosed above, the one or more second sensing scans can be performed proximate to the one or more first sensing scans and during a common period of the first sub-frame when refreshing the image displayed on the touch screen is paused. Some examples of the disclosure are directed to a non-transitory computer readable storage medium. The computer readable medium can contain instructions that, when executed by a processor, can perform the above described method.

Other examples of the disclosure are directed to a method executed by one or more processing circuits. The method can comprise receiving a signal indicative of an end of an extended period during which an image displayed on the touch screen is not updated, in response to receiving the signal, updating the image displayed on the touch screen during a display frame, the display frame comprising a plurality of sub-frames, and in response to receiving the signal, performing a touch scan of the touch screen during a single pause in updating the displayed image of a first sub-frame of the plurality of sub-frames. Additionally or alternatively to one or more of the examples disclosed above, the touch scan can begin at a start of the display frame. Additionally or alternatively to one or more of the examples disclosed above, in some examples, only one touch scan can be performed during the display frame. Additionally or alternatively to one or more of the examples disclosed above, results of the touch scan can be reported at the conclusion of the touch scan. Some examples of the disclosure are directed to a non-transitory computer readable storage medium. The computer readable medium can contain instructions that, when executed by a processor, can perform the above described method.

Other examples of the disclosure are directed to a method executed by one or more processing circuits. The method can comprise receiving a signal indicative of an end of an extended period during which an image displayed on the touch screen is not updated, in response to receiving the signal, updating the touch screen during a display frame, the display frame comprising a plurality of sub-frames, and in response to receiving the signal, performing a touch scan of the touch screen during a pause in updating the displayed image of a first sub-frame of the plurality of sub-frames. The touch scan can begin at a start of the display frame. Additionally or alternatively to one or more of the examples disclosed above, the touch scan can be performed during a single pause in the display update. Additionally or alternatively to one or more of the examples disclosed above, in some examples, only one touch scan can be performed during the display frame. Additionally or alternatively to one or more of the examples disclosed above, results of the touch scan can be reported at the conclusion of the touch scan. Some examples of the disclosure are directed to a non-transitory computer readable storage medium. The computer readable medium can contain instructions that, when executed by a processor, can perform the above described method.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

The invention claimed is:
1. An apparatus comprising:
   a touch screen; and
   one or more processing circuits capable of: receiving a signal indicative of an end of an extended period during which an image displayed on the touch screen is not updated;
     in response to receiving the signal, updating the image displayed on the touch screen during a display frame, the display frame comprising a plurality of sub-frames;
     in response to receiving the signal, performing a touch scan of the touch screen during a pause in the updating the displayed image of a first sub-frame of the plurality of sub-frames, wherein the touch scan begins at a start of the display frame; and
     wherein results of the touch scan are reported at the conclusion of the touch scan.

2. The apparatus of claim 1, wherein the touch scan is performed during a single pause in the display update.

3. The apparatus of claim 1, wherein only one touch scan is performed during the display frame.

4. The apparatus of claim 1, wherein the one or more processing circuits time multiplexes performance of the touch scan and updating the display.

5. The apparatus of claim 1, wherein components of the touch screen are shared between a display function and a touch scan function of the touch screen.

6. A method executed by one or more processing circuits, the method comprising:
receiving a signal indicative of an end of a period of extended display blanking;
in response to receiving the signal, refreshing an image displayed on a touch screen during a plurality of sub-frames of a display frame;
in response to receiving the signal, performing one or more first sensing scans of the touch screen to detect a first type of object touching or hovering over the touch screen during a first sub-frame of the plurality of sub-frames, wherein the one or more first sensing scans occur during a period of the first sub-frame when refreshing the image displayed on the touch screen is paused;
performing one or more second sensing scans to detect a second type of object touching or hovering over the touch screen during one or more of the first sub-frame of the plurality of sub-frames and a second sub-frame of the plurality of sub-frames; and
wherein the one or more second sensing scans are performed proximate to the one or more first sensing scans and during a common period of the first sub-frame when refreshing the image displayed on the touch screen is paused.

7. The method of claim 6, wherein the one or more first sensing scans include stimulating a plurality of sensors of the touch screen to detect mutual capacitance signals or self-capacitance signals.

8. The method of claim 6, wherein the period of the first sub-frame when refreshing the image displayed on the touch screen is paused occurs at the start of the display frame.

9. The method of claim 6, wherein the one or more second sensing scans include detecting signals transmitted from an active stylus.

10. A method executed by one or more processing circuits, the method comprising:
receiving a signal indicative of an end of an extended period during which an image displayed on a touch screen is not updated;
in response to receiving the signal, updating the image displayed on the touch screen during a display frame, the display frame comprising a plurality of sub-frames;
in response to receiving the signal, performing a touch scan of the touch screen during a single pause in updating the displayed image of a first sub-frame of the plurality of sub-frames;
wherein results of the touch scan are reported at the conclusion of the touch scan.

11. The method of claim 10, wherein the touch scan begins at a start of the display frame.

12. The method of claim 10, wherein only one touch scan is performed during the display frame.

13. A non-transitory computer readable storage medium, the computer readable medium containing instructions that, when executed by a processor, can perform a method comprising:
receiving a signal indicative of an end of an extended period during which an image displayed on a touch screen is not updated;
in response to receiving the signal, updating the image displayed on the touch screen during a display frame, the display frame comprising a plurality of sub-frames;
in response to receiving the signal, performing a touch scan of the touch screen during a single pause in updating the displayed image of a first sub-frame of the plurality of sub-frames; and
wherein results of the touch scan are reported at the conclusion of the touch scan.

14. The non-transitory computer readable storage medium of claim 13, wherein the touch scan begins at a start of the display frame.

15. The non-transitory computer readable storage medium of claim 13, wherein only one touch scan is performed during the display frame.

* * * * *